Aug. 23, 1966   A. ECKHAUS   3,267,516
LOW-FRICTION LOW-ADHESION TOOLS AND UTENSILS AND
METHODS OF MAKING SAME
Filed March 2, 1964   3 Sheets-Sheet 1

INVENTOR.
ALLAN ECKHAUS
BY Roland Plottel
ATTORNEY

INVENTOR.
ALLAN ECKHAUS

BY Roland Plotel

ATTORNEY

United States Patent Office 3,267,516
Patented August 23, 1966

3,267,516
LOW-FRICTION LOW-ADHESION TOOLS AND
UTENSILS AND METHODS OF MAKING SAME
Allan Eckhaus, 57 Claire Ave., New Rochelle, N.Y.
Filed Mar. 2, 1964, Ser. No. 348,688
3 Claims. (Cl. 18—3.5)

The invention relates generally to tools or utensils, and to means for manufacturing them, and particularly to tools or utensils for use with sticky substances.

There are many common operations involving the application, mixing, or modeling of sticky materials. Such household tasks as puttying, plastering, epoxy mixing and application, cake icing, cement work, clay modeling and floor tile adhesive spreading make use of "sticky" substances. The tools presently used may be difficult to clean after use. The degree of difficulty ranges from easy to clean for cake frosting, for example, to very difficult (almost impossible) for epoxies. Furthermore some of the operations with sticky substances require controlling the flow of material to obtain either a smooth surface, or a shaped or textured surface. The relative friction and adhesion between the tool and the material causes uneven surfaces, and makes it difficult to accurately control the flow of material. This problem is aggravated by an accumulation of semihardened or dried material on the tool. These deposits must be removed continually to maintain a clean working surface. It is an object of the present invention to provide an improved tool which overcomes these inconveniences.

Another object of the invention is to provide an improved tool that facilitates the workings of gummy substances.

Another object of the invention is to provide an improved tool that is easy to clean, not only while in use, when the material is not yet hardened, but also after use, when the material which has accumulated on the working surface may be set.

Another object of the invention is to provide an improved spreading tool that is capable of imparting to sticky substances a smooth surface and a minimum of voids, just below the surface.

Another object of the invention is to provide an improved spreading tool with which it is easy to spread sticky substances i.e. less effort, more speed, less skill than is the case with conventional tools.

Still another object of the present invention is to provide an improved method of attaching a low-friction, low-adhesion material to a handle.

A further object of the present invention is to provide a novel tool whose handle and blade are both made of low-friction low-adhesion material, so that it is easy to clean sticky substances not only off the blade but also off the handle. Furthermore since the low-friction low-adhesion materials are generally chemically inert, the tool having its handle and blade made of these materials would resist chemical action.

According to the invention there is provided a tool adapted for use with sticky substances comprising a working surface adapted to contact said sticky substance, said surface being made of a low-friction, low-adhesion material. The invention also includes a method of attaching a low-friction low-adhesion member to another member and comprises the steps of shaping a portion of the low-friction low-adhesion material into a tang, forming an aperture in said tang, shaping a tang receiving socket in said other member, filling said aperture with glue, and placing said tang in said socket.

The above objects of and brief description of the present invention will be more fully understood and further objects and advantages will become apparent from a study of the following description in connection with the drawings wherein.

Figure 1:
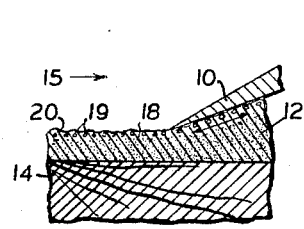
FIGURES 1 and 2 are side cross section views of a conventional putty knife shown applying putty.
Figure 2:
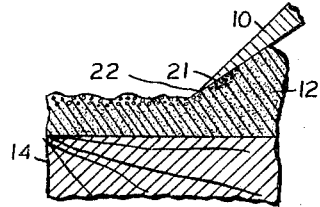

Referring to the drawing of FIGURES 1 and 2 there is shown therein a side-cross-sectional view of a conventional putty knife blade 10 in the act of applying putty 12 to a surface of a piece of wood 14. The putty has a tendency to stick to the blade 10, so that as the blade is moved (in the figure the direction of movement is shown by an arrow 15) shear forces are induced in the putty near the blade, causing the putty to tear away from the moving tool. The tearing of the putty has the result that the spread putty 18 has voids 19 near the surface, as well as a rough surface 20. The analysis of the spreading of putty, is analogous to the turbulent flow of a viscous fluid through a rough passage.

A further difficulty in applying putty with the conventional tool is illustrated in FIGURE 2. Because of the tendency of the putty 12 to stick to the blade 10 a small amount of hardened or semihardened putty 21 tends to build up on the blade 10 near its edge 22. The built-up deposit 21 aggravates the rough surface on the spread putty, and if any degree of smoothness is to be achieved the dried putty 21 must be continually removed.

Figure 3:
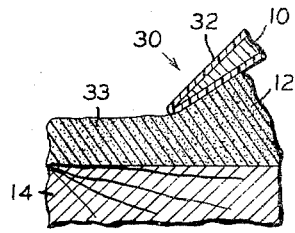
FIGURE 3 is a side cross sectional view of a putty knife blade constructed in accordance with the teachings of this invention.

In FIGURE 3, there is shown a putty knife blade 30 constructed in accordance with the teachings of this invention. The blade 30 has a surface 32 of a low-friction low-adhesion material. Thus the adhesion of the putty 12 to the surface 32 of the blade 30 is less than its adhesion to the conventional blade shown in FIGURES 1 and 2. Thus any shear forces set up in the putty are negligible; and the putty slips smoothly off the surface 32. The result is that the spread putty 33 has a smooth surface and few voids. Experimentation has verified that a simple spatula having a low-friction low-adhesion surface not only spread putty smoother than a steel spatula but did not build up a mound of semi-hardened putty near the edge. Using the fluid flow analogy applied above, the application of putty with the low-friction low-adhesion surfaced tool is that of a streamline (laminar) flow of a viscous fluid through a smooth and frictionless passage.

Low-friction low-adhesion materials currently available include fluorocarbon resins such as tetrafluoroethylene or fluoroinated ethylene propylene. Some of the above materials are sold commercially under the trade name of "Teflon." Additional low-adhesion low-friction materials are found among the silicone compounds, and plastics such as polypropylene and polyethylene.

Figure 4:
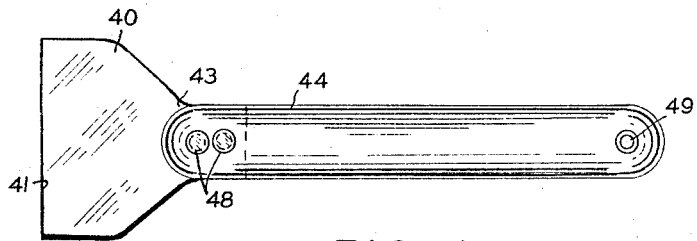
FIGURES 4 and 5 are respectively a top and side view of a tool constructed in accordance with the invention.
Figure 5:
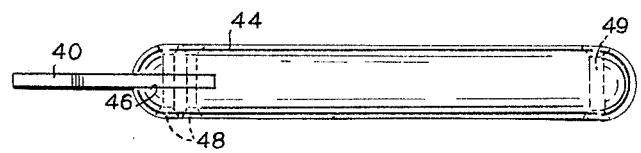

Referring to the drawings of FIGURES 4 and 5, there is shown a preferred embodiment of a tool or utensil constructed in accordance with the invention. FIGURE 4 is a top view of the tool; FIGURE 5 is a side view. The tool has a blade 40 stamped from a Teflon sheet, and may for example be $3/32$ inch thick, $1\frac{3}{8}$ inches wide at its outer edge 41, and ⅞ of an inch in length. The blade is tapered at one end to form a tang or shank 43, which fits into a slot 46 in a handle 44. Two dowels or rivets 48 pass through the handle 44 and the blade 40, securing the blade to the handle. The handle may be made for example from a ½ inch diameter polyethylene or polypropylene rod, and the dowels may be made of ⅛ inch diameter polyethylene. The dowels may be forced into the holes and retained in place by friction between themselves and the walls of the holes, or by a heat seal, or by a heat deformation of the ends of the dowels similar to the manner in which a rivet is deformed. Alternatively, the dowels may be glued to the walls of the holes. If glue is used, the adhesion will be mostly between the dowel and the surface of the holes in the handle, because the low adhesion properties of the Teflon blade will thwart the glue. A hangup hole 49 may be placed at the other end of the handle. The blade 40 has been described as being stamped from a sheet of Teflon, the blade may be moulded, or formed by any convenient or conventional method.

Figure 5A:
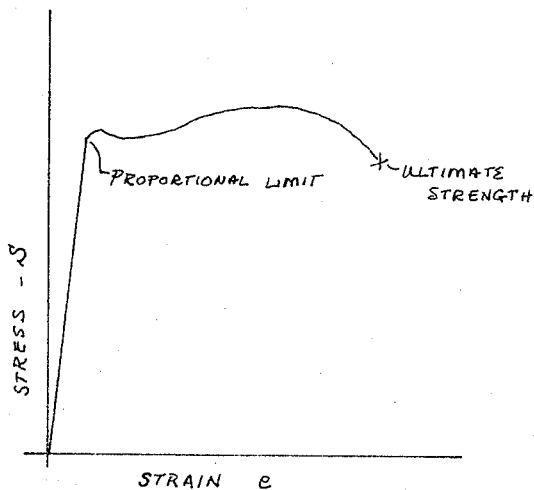
FIGURE 5A is a graph showing the characteristic stress strain curve for metallic alloys.
Figure 5B:
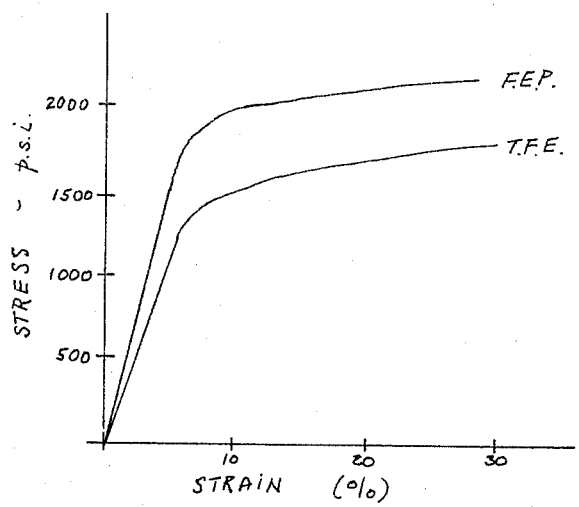
FIGURE 5B is a graph showing the characteristic stress strain curve for Teflon.

At this point it is desirable to examine the unusual stress-strain relationships of Teflon as compared to conventional tool materials such as stainless steel or carbon steel. The comparison will be assisted by referring to FIGURES 5A and 5B. FIGURE 5A shows the characteristic stress curve for metallic alloys; and FIGURE 5B shows the characteristic stress curve for Teflon.

Referring to FIGURE 5A, it is seen that metals exhibit a definite range of linear deformation to applied stress in which the nature of the deformation is elastic and the material will return to its initial shape when the loading stress is removed. The linear relationship coefficient between applied stress and resultant strain is called Young's modulus $$E = \frac{S}{e}$$

and the maximum stress which can produce elastic deformation is called the Proportional Limit (see legend on FIGURE 5A). This is called the elastic region. Beyond the elastic region the deformation in the material is considered plastic in nature and permanent deformation of the material will occur.

The elastic region of deformation is utilized in spring design and is also adapted to the design of tools such as spatulas and putty knives. The tools should be flexible enough to allow control over irregular shapes and allow freedom of blade movement, yet should be rigid enough to operate within the elastic limit and allow the tool to spring back to its original shape by itself. The actual degree of rigidity and flexbility is a quantity which differentiates a quality tool which feels good to work with from an inferior tool. The terms rigid and flexible are relative indications of the stress level encountered in a particular design. For example, a thin section of any material when subjected to a given binding stress will deflect a greater amount than a thick section of the same material. The stress level in the thin section will be higher and the material will in effect, be operating at a higher point in the stress-strain curve. The thin section at high stress levels will be termed flexible relative to the rigid thick section.

Teflon, as with most thermo plastics, does not exhibit the same linear stress-strain characteristics over a large region as do metals. Reference is made to FIGURE 5B, which shows a typical stress curve for two types of Teflon. The upper curve is F.E.P. type Teflon and the lower curve is T.F.E. type Teflon. The purely elastic linear region is very short and the relationship then departs from linearity even at small strain values. However, the deformation occurring in the plastic or non-linear region may not be permanent and the material will slowly tend to restore its original shape (memory). The initial position may be restored physically by reversing the load direction with no permanent deformation having occurred (assuming the initial stress was below the failure point). The physical result of these characteristics is a sluggish or "floppy" feel to Teflon when operating in the non-linear region. This sluggish behaviour is detrimental to ease of handling and results in a tool with poor feel. Examples of design calculations for a poor tool and a good tool will now be derived.

Let $L$=length of blade from its end to where it is first joined to a handle
$P$=a transverse force exerted at the end of the blade, equivalent to the transverse force exerted on the blade
$M$=Bending moment=$P \times L$
$C$=distance to neutral fiber of beam, i.e. ½ the thickness of the blade
$I$=moment of inertia of cross-section=the width of the blade multiplied by the thickness of the blade raised to the third power divided by 12
$S_{max}$=maximum stress before the proportional limit is passed=$M \times C/I$ A realistic value for $P$ would be 0.5 lb. This value is actually well below the relative forces encountered in many kitchen operations such as cleaning bowls or scraping food from a skillet. An example of a poor tool would be one whose dimensions produced a stress value, for example of 1400 p.s.i. or greater, i.e., a stress value well into the non-linear or non-elastic deformation region for T.F.E. flurocarbon and out of the linear region for F.E.P. flurocarbon. Thus *floppy* operation will occur. A tool whose blade has the dimensions recited above in connection with the drawing of FIGURES 4 and 5 has a maximum stress of 794 p.s.i. The stress encountered in this tool is within the linear regions of both T.E.F. and F.E.P. Teflon as will be seen from referring to the graph in FIGURE 5B. In practice, this tool exhibits a tendency to spring back to its original shape.

Since it is not always economically feasible to use thick sections of Teflon to obtain required rigidity in a particular tool, an insert of a stiffer material may be used to give the structure the desired stiffness. This principle applies to laminates and Teflon coated substrates, and where the flexural qualities of the structure are determined by substrate design. Any desired flexural quality may be achieved by proper choice of substrate material and correct thickness of substrate relative to Teflon thickness.

Figure 6:
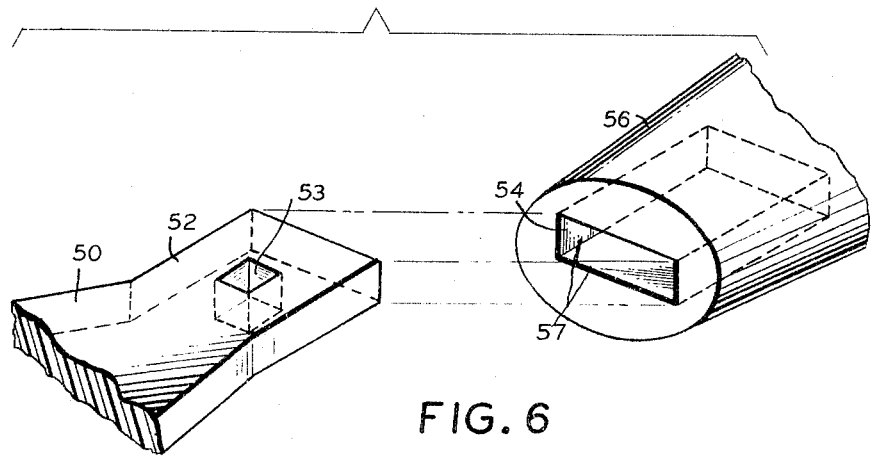
FIGURE 6 is an exploded view of a section of an alternative embodiment, and illustrates a method of making the tools.

FIGURE 6 is an exploded view of a section of a novel tool, and illustrates an alternative means and method of attaching an all Teflon blade to a handle. As noted above, the low adhesion properties of the Teflon blade prevent it from being glued to the handle. The all-Teflon blade 50 is shown with its tang or shank 52, having an aperture, or eye 53. The shank 52, fits into a tang accepting socket 54, in a handle 56. Prior to inserting the shank into the socket, the eye 53 is filled with a glue (not shown), which will adhere to the walls 57 of the socket 54. The tang 52 is then inserted in the socket 54; the glue adheres to the wall 57, and forms a body of hardened glue in the eye which holds the blade to the handle. The glue may or may not adhere to the all-Teflon blade. The tightness of the fit between the tang and the socket will assist in keeping the blade rigid in the handle. The tang accepting socket is shown as a rectangle; however any other convenient shape may be used, for example a three sided socket similar to the slot shown in FIGURES 4 and 5 or an H shaped socket could be used. Also the shape of the recess in the tang may be varied. To reduce stress at the joint between the handle and the blade and to provide a better joint it is advisable that the blade fit into the handle and be surrounded by the handle on at least two sides. A butt joint with only one surface of the blade on contact with the handle, or over a limited area is not so good.

Figure 7:
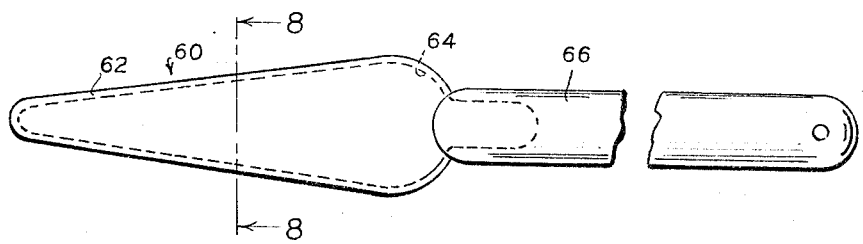
FIGURE 7 is an alternative embodiment of the invention.
Figure 8:
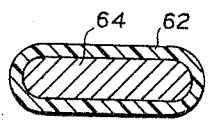
FIGURE 8 is a cross sectional view of the tool shown in FIGURE 7.

FIGURE 7 illustrates an alternative embodiment of the invention, and FIGURE 8 is a cross sectional view taken along lines 8—8 of FIGURE 7. A blade 60 has a Teflon sheath 62 over a wood or plastic support 64 which is firmly attached to a handle 66. The handle 66 and support 64 may be made from one or two pieces. The Teflon sheath 62 and the support 64 have a convex shape, or bowed out at the middle shape, so that the sheath must be initially forced over the support. Once in place, it is held secure by the narrowing of the inside of the sheath towards the handle. The Teflon is sufficiently tough to resist tearing while being slipped over the support, and is also sufficiently resilient to retain its original shape after being slipped on. The Teflon sheath, or the blade may have to be heated before being connected. Teflon becomes soft at about 350° F. and can be stretched; upon cooling it returns to its original shape. Alternatively, a straight support could be used and a tight fitting Teflon sheath would remain in place due to friction, in spite of its low friction properties.

Alternatively, the blade of the tool may have only a coating of Teflon over a support as is shown in FIGURE 3. Various methods of coating surfaces with Teflon are well-known.

The support should preferably be made of wood, plastic or similar semi-hard materials because the Teflon surfaces are generally fairly soft and may be scratched off; it is more difficult to rub the Teflon off the soft support.

The invention has so far been described as applied to a putty knife but it need not be limited to a putty knife and may be applied to a wide variety of tools and utensils such as—but not restricted to—window tools; spatulas; clay modeling tools; cement trowels; hawks; artists' palette knives; ceramic tile cement spreaders and grouters; autobody filler spreaders; glue mixers; caulking knives; cake icers; plastering tools; floats; floor tile cement spreaders; paint mixers; pipe compound applicators, dough and batter mixers; dental pallets; mortars; pestles.

Figure 9:
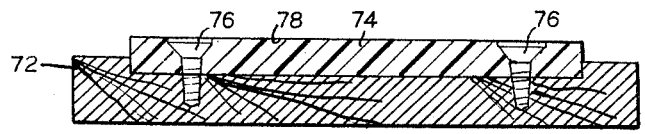
FIGURE 9 is an alternative embodiment of the invention.

To illustrate one further embodiment of the invention, reference is made to FIGURE 9, wherein there is shown a cross sectional view of a dentist's palette of the kind in which dental porcelains and cements are mixed. The palette has a base 72 which may be of wood, plastic, or metal, on which is secured a Teflon sheet 74. The Teflon sheet is shown here secured by recessed screws 76. Any other convenient or conventional method of attaching may be used, such as roughening the under surface of the Teflon and glueing it to the base or coating the Teflon on the base. A recently developed technique permits laminations of Teflon directly on a base material which may be aluminum, steel, or brass. It has been reported that the lamination improves the surface quality of the Teflon so that its resistance to deformation (i.e. shear) approaches that of the substrate material. Porcelain may be mixed on the low-friction low-adhesion surface 78 of the sheet 74 with a low-friction low-adhesion tool which may, for example, be similar to the knife shown in FIGURES 4 and 5, but having a smaller blade, for example 1/16 of an inch thick, 3/8 of an inch wide, and 1/2 of an inch long. The porcelain would not adhere to the palette during mixing and would be easy to clean off after each use. The palette may have a flat surface as shown, or a concave one approaching a mortar shape.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A tool for use with sticky substances comprising a Teflon blade which has an elastic region of deformation up to a given amount of stress ($S_{max}$), said blade having a length-width-thickness-ratio less than $S_{max}$ where $$S_{max} = \frac{length \times thickness/2}{width \times \frac{(thickness)^3}{12}} \times 1 \text{ pound}$$

and a handle attached to the blade.

2. A tool for use with sticky susbtances comprising a Teflon blade which has an elastic region of deformation up to a given amount of stress ($S_{max}$), said blade having a length-width-thickness-ratio less than $S_{max}$ where $$S_{max} = \frac{length \times thickness/2}{width \times \frac{(thickness)^3}{12}} \times 5 \text{ pounds}$$

and a handle attached to the blade.

3. A tool for use with sticky substances comprising a Teflon blade which has an elastic region of deformation up to a given amount of stress ($S_{max}$), said blade having a length-width-thickness-ratio less than $S_{max}$ where $$S_{max} = \frac{length \times thickness/2}{width \times \frac{(thickness)^3}{12}} \times 10 \text{ pounds}$$

and a handle attached to the blade.

References Cited by the Examiner

UNITED STATES PATENTS

| | | | |
|---|---|---|---|
| 2,244,000 | 6/1941 | Oliver | 18—35 |
| 2,765,441 | 11/1956 | Gambrill. | |
| 2,799,045 | 7/1957 | Hillegas. | |
| 2,855,669 | 10/1958 | Duke | 30—967 XR |
| 3,071,858 | 1/1963 | Alter | 30—351 |

FOREIGN PATENTS

| | | |
|---|---|---|
| 1,012,393 | 7/1952 | France. |
| 110,301 | 10/1960 | Pakistan. |
| 111,513 | 2/1962 | Pakistan. |

OTHER REFERENCES

Teflon—Du Pont de Nemours Co., copyright 1957, TP–986 T 28 D 8, p. 13.

WILLIAM J. STEPHENSON, *Primary Examiner.*